(12) United States Patent
Krishnamoorthy et al.

(10) Patent No.: US 6,356,586 B1
(45) Date of Patent: Mar. 12, 2002

(54) METHODS AND APPARATUS FOR PARALLEL DECISION-FEEDBACK DECODING IN A COMMUNICATION SYSTEM

(75) Inventors: Rajeev Krishnamoorthy, Middletown; Hui-Ling Lou, Murray Hill; Harish Viswanathan, Matawan, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/390,387

(22) Filed: Sep. 3, 1999

(51) Int. Cl.[7] ............................................... H03H 15/00
(52) U.S. Cl. ...................... 375/233; 375/262; 375/265; 375/341; 708/323; 714/792; 714/796
(58) Field of Search ................................ 375/233, 234, 375/229, 232, 261, 262, 264, 265, 341, 348, 350; 714/792, 794–796; 708/323

(56) References Cited

U.S. PATENT DOCUMENTS

| | | | | |
|---|---|---|---|---|
| 5,056,117 A | * | 10/1991 | Gitlin et al. | 375/102 |
| 5,872,817 A | * | 2/1999 | Wei | 375/341 |
| 6,012,161 A | * | 1/2000 | Ariyavisitakul et al. | 714/795 |
| 6,226,323 B1 | * | 5/2001 | Tan et al. | 375/233 |

OTHER PUBLICATIONS

G. Ungerboeck, "Trellis–Coded Modulation with Redundant Signal Sets, Part I: Introduction," IEEE Communciations Magazine, vol. 25, No. 2, pp. 5–11, Feb. 1987.
G. Ungerboeck, "Trellis–Coded Modulation with Redundant Signal Sets, Part II: State of the Art," IEEE Communciations Magazine, vol. 25, No. 2, pp. 12–21, Feb. 1987.
M.V. Eyuboglu et al., "Reduced–State Sequence Estimation for Coded Modulation on Intersymbol Interference Channels," IEEE Journal on Selected Areas in Communications, vol. 7, No. 6, pp. 989–995, Aug. 1989.
K. Wesolowski, "Efficient Digital Receiver Structure for Trellis–Coded Signals Transmitted Through Channels with Intersymbol Interference," Electron. Letters, pp. 1265–1267, Nov. 1987.
A. Duel–Hallen et al., "Delayed Decision–Feedback Sequence Estimation," IEEE Trans. on Communciations, vol. 37, pp. 428–436.
S. Ariyavisitakul et al., "A Broadband Wireless Packet Technique Based on Coding, Diversity, and Equalization," IEEE Communications Magazine, pp. 110–115, Jul. 1998.
S. Ariyavisitakul et al., "Joint Coding and Decision Feedback Equalization for Broadband Wireless Channels," IEEE Journal on Selected Areas and Communications, vol. 16, No. 9, pp. 1670–1678, Dec. 1998.
S.H. Muller et al., "Redyced–State Soft–Output Trellis–Equalization Incorporating Soft Feedback," IEEE Globecom'96, pp. 95–100, Nov. 1996.

* cited by examiner

*Primary Examiner*—Stephen Chin
*Assistant Examiner*—Dac V. Ha
(74) *Attorney, Agent, or Firm*—Ryan, Mason & Lewis, LLP

(57) ABSTRACT

Parallel Decision-Feedback Decoding (PDFD) techniques which provide joint Decision Feedback Equalization (DFE) and decoding of a sequence of transmitted symbols. In an illustrative embodiment, branch metrics associated with transitions between states of a multi-stage trellis are computed. For a given stage t of the trellis, the branch metrics are computed for each of the states, using a different input value $y_t(s)$ for each state. The input values $y_t(s)$ correspond to extended survivor paths computed for each state using a DFE process. The branch metrics are utilized to determine a global most-likely path through the trellis, and the path is used to generate a decoded output signal representative of the transmitted symbol sequence. The PDFD techniques of the invention provide significant performance gains relative to conventional techniques, and are suitable for use with both PSK and QAM modulation constellations.

11 Claims, 3 Drawing Sheets

METHODS AND APPARATUS FOR PARALLEL DECISION-FEEDBACK DECODING IN A COMMUNICATION SYSTEM

FIELD OF THE INVENTION

The invention relates generally to communication systems and, more particularly, to decoding techniques for use in such systems.

BACKGROUND OF THE INVENTION

Broadband wireless communication systems such as fixed wireless local loop and mobile satellite systems have been experiencing tremendous growth. These systems are mainly subject to slowly-varying Rician fading channels. As an example, consider a high bit-rate Time Division Multiple Access (TDMA) fixed wireless local loop system in which communication between base stations and stationary terminals occurs in bursts. For such a system, the channel is typically a slowly-varying, frequency-selective fading channel and can be considered constant over the duration of a packet or a time slot in a frame. Hence the channel can be viewed as a Gaussian Inter Symbol Interference (ISI) channel in each frame.

Depending on the channel and interference conditions, the modulation technique used in these systems can be, e.g., Quadrature Phase Shift Keying (QPSK), 8-PSK, 16-QAM (Quadrature Amplitude Modulation), 32-QAM or an even larger constellation. This allows the use of bandwidth efficient Trellis Coded Modulation (TCM), as described in, e.g., G. Ungerboeck, "Trellis-Coded Modulation with Redundant Signal Sets, Part I. Introduction," IEEE Communications Magazine, Vol. 25, No. 2, pp. 4–11, February 1987, and G. Ungerboeck, "Trellis-Coded Modulation with Redundant Signal Sets, Part II: State of the Art," IEEE Communications Magazine, Vol. 25, No. 2, pp. 12–21, February 1987. At high symbol rates, the delay spread can introduce ISI among many symbols and thus preclude the use of Maximum Likelihood Sequence Estimation (MLSE) type of equalizers for large QAM constellations. A Decision Feedback Equalizer (DFE) is therefore typically used to combat ISI of the transmitted symbols.

It is well known that the performance of a system using separate DFE and channel decoding is significantly degraded by error propagation in the DFE. See M. V. Eyuboglu and S. U. Qureshi, "Reduced-state Sequence Estimation for Coded Modulation on Intersymbol Interference Channels," IEEE Journal on Selected Areas in Communications, 7(6):989–995, August 1989. Several joint equalization and decoding techniques have been proposed to improve the performance of coded modulation techniques when a DFE is used. These techniques provide a variety of performance versus complexity tradeoffs.

One such technique, referred to as Parallel Decision-Feedback Decoding (PDFD), is described in, e.g., M. V. Eyuboglu and S. U. Qureshi, "Reduced-state Sequence Estimation for Coded Modulation on Intersymbol Interference Channels," IEEE Journal on Selected Areas in Communications, 7(6):989–995, August 1989, K. Wesolowski, "Efficient digital receiver structure for trellis-coded signals transmitted through channels with intersymbol interference," Electron. Letters, pp. 1265–1267, November 1987, and A. Duel-Hallen and C. Heegard, "Delayed decision-feedback sequence estimation," IEEE Trans. on Communications, Vol. 37, pp. 428–436, May 1989. PDFD is designed to reduce the complexity of an optimum joint MLSE technique. Even though PDFD is suboptimal in performance compared to the optimum joint MLSE technique, depending on the channel conditions, it can still achieve significant performance gains. The decoder trellis complexity of PDFD is the same as that of the corresponding TCM decoder trellis complexity, while the complexity of the optimum joint MLSE technique can be very high and therefore prohibitive for high bit-rate applications.

Recently, an alternative reduced-complexity equalization technique based on soft-decision feedback equalization (S-DFE) has been demonstrated to have a significant gain over traditional hard-decision feedback equalization (H-DFE) for QPSK modulation. See S. Aryavisitakul and G. Durant, "A broadband wireless packet technique based on coding, diversity, and equalization," IEEE Communications Magazine, pp. 110–115, July 1998, S. Aryavisitakul and Y. Li, "Joint coding and decision feedback equalization for broadband wireless channels," IEEE Journal on Selected Areas and Communications, pp. 1670–1678, December 1998, and S. H. Muller et al., "Reduced-state soft-output trellis-equalization incorporating soft feedback," IEEE GLOBECOM'96, pp. 95–100, November 1996. However, the gains obtained using S-DFE for large constellations are much smaller than what is obtained for QPSK. More particularly, as the constellation size increases, the magnitude of the error made by a S-DFE for an incorrect decision approaches that of a H-DFE. Hence the effect of error propagation in S-DFE is comparable to that of H-DFE and thus the gain is not that significant.

As is apparent from the above, a need exists for improved reduced-complexity decoding techniques which are suitable for use with large modulation constellations, and which overcome the problems associated with the conventional PDFD, S-DFE and H-DFE techniques.

SUMMARY OF THE INVENTION

The present invention provides improved Parallel Decision-Feedback Decoding (PDFD) techniques in which Decision Feedback Equalization (DFE) and channel decoding are performed jointly, and the DFE is implemented for multiple survivor paths, rather than for a single survivor path as in a conventional arrangement. The invention is suitable for use in decoding applications in which a sequence of symbols are decoded by determining a most-likely path through a finite state machine representation known as a trellis. In accordance with the invention, a DFE feedback path is computed separately for each survivor path of each state in the trellis. This is done at each decoding stage, i.e., for each stage t of the trellis. For a given stage t of the trellis, branch metrics are computed for each of the states, using a different input value $y_t(s)$ for each state. The input values $y_t(s)$ correspond to extended survivor paths computed for each state using the DFE feedback paths. The branch metrics are utilized to determine a global most-likely path through the trellis, and the most-likely path is used to generate a decoded output signal representative of the transmitted symbol sequence. This PDFD technique in accordance with the invention thus generates DFE values for each survivor path corresponding to each state in the trellis. The feedback path of each DFE uses, e.g., the last $N_b$ decoded symbols in the survivor path of that state, where $N_b$ is the number of taps in the DFE feedback path.

The invention allows PDFD to be applied efficiently in high bit-rate systems such as, e.g., broadband wireless local loop systems with stationary terminals. The invention can be utilized with a wide variety of different modulation constellations, such as, e.g., Quadrature Phase Shift Keying (QPSK), 8-PSK, 16-QAM (Quadrature Amplitude Modulation), 32-QAM or larger constellations. Advantageously, the joint DFE and decoding techniques of the invention achieve significant performance gains as compared to separate DFE and channel decoding techniques, for both PSK and QAM constellations.

DETAILED DESCRIPTION OF THE INVENTION

Figure 1:
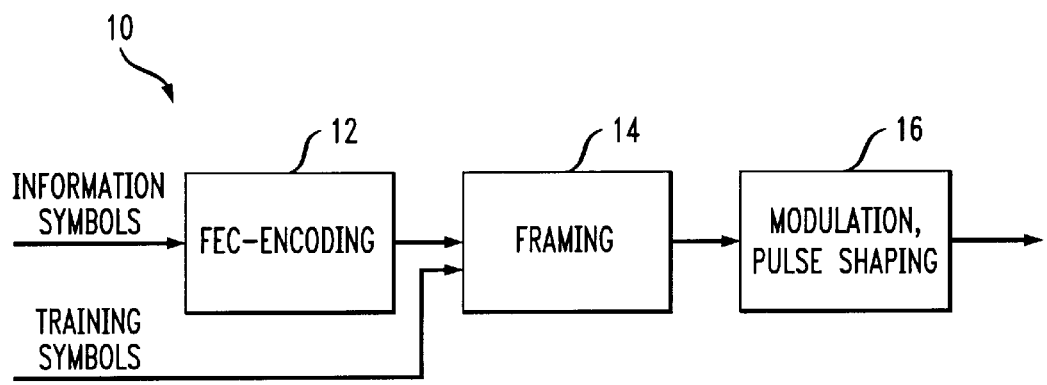
FIG. 1 shows an exemplary transmitter suitable for use in conjunction with the invention.

FIG. 1 shows an exemplary transmitter 10 suitable for use in conjunction with the invention.

The transmitter 10 includes a Forward Error Correction (FEC) encoding block 12 for encoding input .i information symbols, a framing block 14 in which training symbols are added to the information symbols, and a modulation and pulse shaping block 16 which includes, e.g., a modulation constellation mapper followed by a transmit pulse shaping filter.

Figure 2:
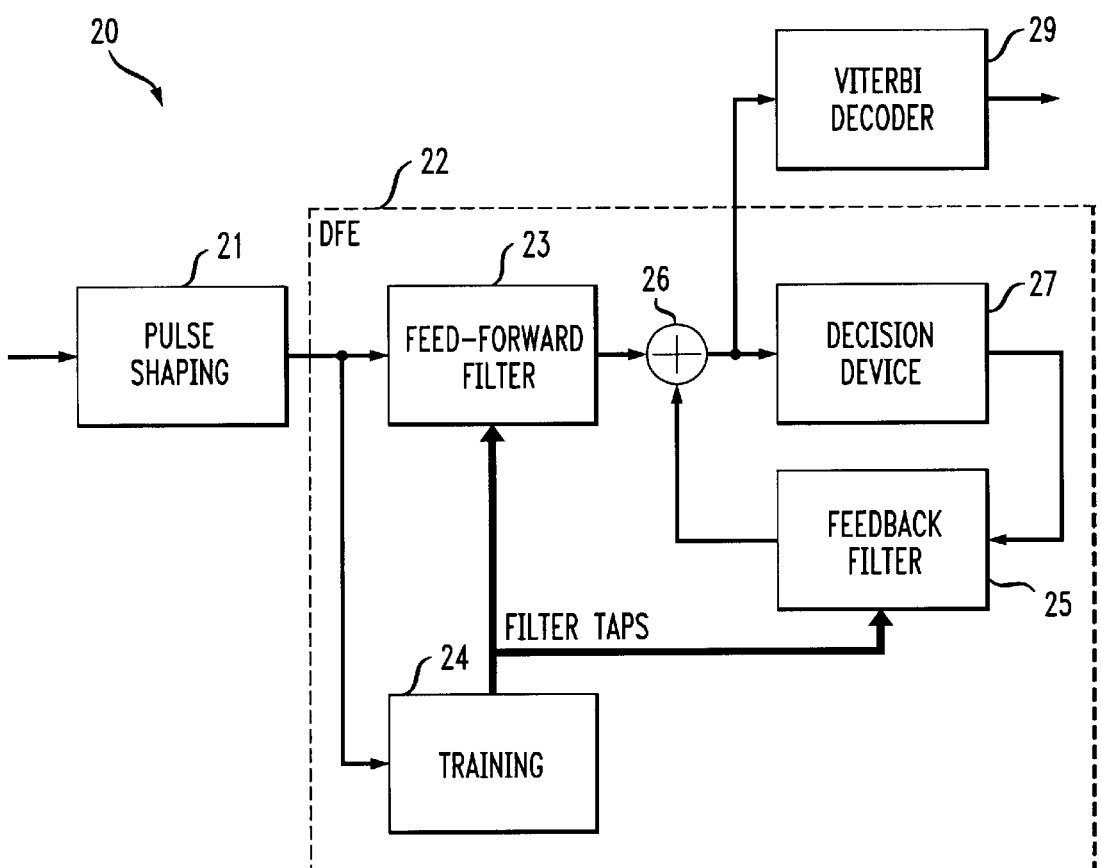
FIG. 2 shows an exemplary receiver with separate Decision Feedback Equalization (DFE) and decoding operations.

FIG. 2 shows a receiver 20 in which separate Decision Feedback Equalization (DFE) and FEC decoding operations are utilized, rather than the joint DFE and decoding techniques of the present invention. A sampled received signal is filtered using a pulse shaping filter 21 matched to the pulse shaping used at the transmitter. A DFE block 22 includes a fractionally-spaced feed-forward filter 23, a training block 24, and a symbol-spaced feedback filter 25. The filters 23 and 25 may be configured in a well-known manner using techniques such as those described in, e.g., S. Haykin, "Adaptive Filter Theory," Prentice-Hall, NJ, 1996. The training block 24 utilizes training symbols to determine appropriate sets of filter taps for the filters 23 and 25. In operation, outputs of the feed-forward filter 23 are combined with corresponding outputs of feedback filter 25 in a signal combiner 26, and the result is supplied to a decision device 27. The decision device 27 is in turn applied to an input of the feedback filter 25, completing the feedback loop. As will be described below, so-called "soft" or tentative decisions from the DFE 22 are fed from the signal combiner 26 to a Viterbi decoder 29 for use in FEC decoding.

The Viterbi decoder 29 decodes a sequence of symbols by determining a global most-likely path through a finite state machine representation known as a trellis. The trellis generally describes the possible state transitions from symbol to symbol, based on the particular type of channel coding used. The Viterbi decoder 29 generally has a latency of L decoding stages, where L is the decoding depth, as described in, e.g., G. D. Forney Jr., "Maximum-Likelihood Sequence Detection in the Presence of Intersymbol Interference," IEEE Trans. on Information Theory, IT-18(3):363–378, May 1972, and G. D. Forney Jr., "The Viterbi Algorithm," IEEE Proceedings, IT-61(3):268–278, March 1973. Thus, the DFE 22 cannot wait for the decoder 29 to determine the global most-likely path and then feed the decoded symbols into the feedback path of the DFE. Therefore, the DFE 22 itself makes a tentative decision regarding the most-likely path before the Viterbi decoder 29 makes its decision.

In contrast to the separate DFE and decoding arrangement of FIG. 2, the PDFD techniques of the present invention generally use tentative decisions from a modified Viterbi decoder, rather than from a decision device such as decision device 27, for a given feedback path of the DFE. More particularly, a DFE feedback path is computed separately for each survivor path of each state in the trellis in order to determine the soft decision output for each state. This is done at each decoding stage t of the modified Viterbi decoder. In other words, the PDFD algorithm maintains a DFE for each survivor path corresponding to each state in the trellis. The feedback path of each DFE uses the last $N_b$ decoded symbols in the survivor path of that state, where $N_b$ is the number of taps in the feedback path of the DFE and is typically a design parameter.

Figure 3:
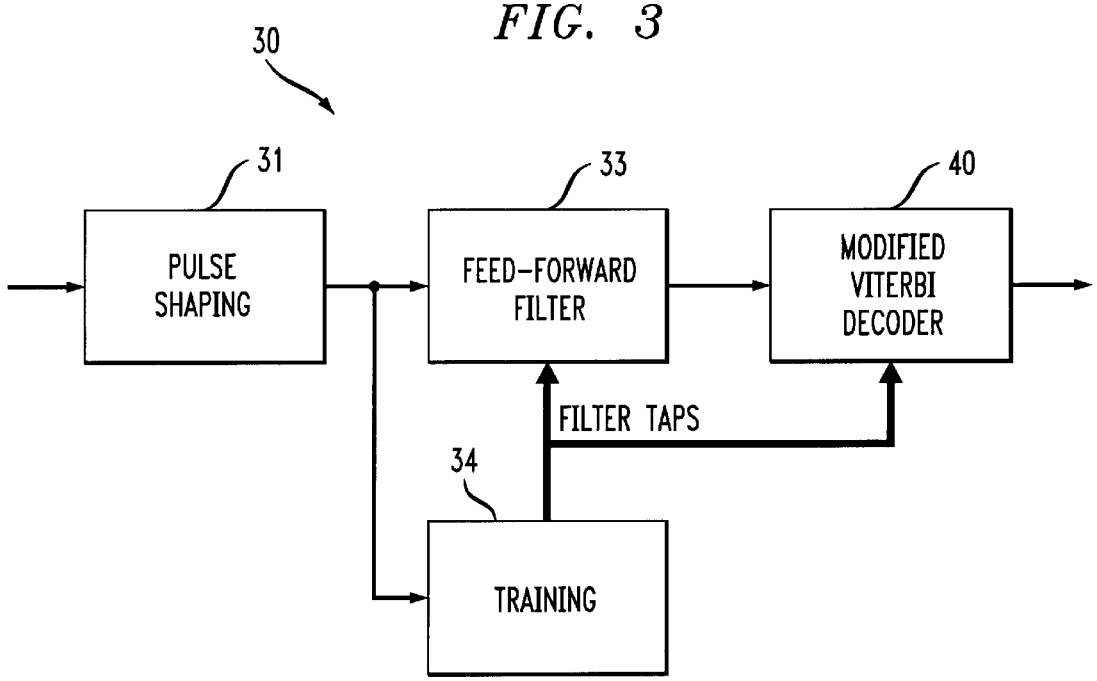
FIG. 3 shows an exemplary receiver with joint DFE and decoding operations in accordance with the invention.

FIG. 3 shows an exemplary PDFD receiver 30 in accordance with the invention. The receiver 30 includes a pulse shaping filter 31, a fractionally-spaced feed-forward filter 33, a training block 34, and a modified Viterbi decoder 40, arranged as shown. In operation, at the end of a given training symbol period, filter tap values from the feedback filter 33 are sent to the Viterbi decoder 40 and utilized in a PDFD decoding algorithm to be described in detail below.

A PDFD algorithm suitable for implementation in the PDFD receiver of FIG. 3 can be described mathematically as follows. Denote the survivor path at state s of decoding stage t by $(x_t(s, i), 1 \leq i \leq t)$ where $x_t(s, i)$ is the decoded symbol on the branch between decoding stage i−1 and decoding stage i. If the feed-forward and feedback taps of the DFE are $w=(w_1, \ldots, w_{N_f})$ and $b=(b_1, \ldots, b_{N_b})$, respectively, then the survivor path at state s would be extended based on a branch metric calculated in modified Viterbi decoder 40 using:

$$y_t(s) = \sum_{i=0}^{N_f-1} w_i r(t+i) - \sum_{j=1}^{N_b} b_j x_t(s, t-j), \quad (1)$$

where r(t) is the output of the feed-forward filter 33 at stage t and $N_b$, $N_f$ are the number of feedback and feed-forwards taps, respectively. Thus, the branch metric calculation in the modified Viterbi decoder 40 has to be repeated for each state. This is in contrast to a conventional Viterbi decoder that obtains the same output value from the DFE, e.g., as illustrated in FIG. 2. Therefore, the PDFD algorithm not only has to update the feedback path of the DFE, given the current Viterbi decoder survivor path for each state, it also has to compute the branch metrics using a different input value $y_t(s)$ for each state.

Figure 4:
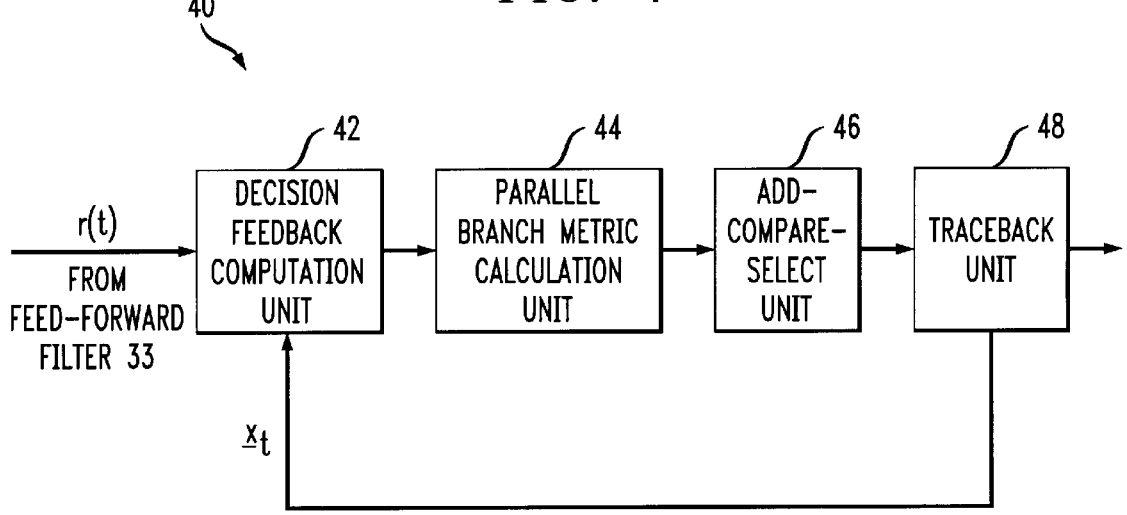
FIG. 4 shows an illustrative embodiment of a modified Viterbi decoder in accordance with the invention.

FIG. 4 shows an illustrative embodiment of the modified Viterbi decoder 40 of FIG. 3. The decoder 40 includes a decision feedback computation unit 42, a parallel branch metric calculation unit 44, an add-compare-select unit 46, and a traceback unit 48. The decision feedback computation unit 42 receives the signal r(t) from the feed-forward filter 33, and updates the feedback path of each of the parallel DFEs, i.e., computes a decision feedback value for each state s in a given stage t of the trellis. The decision feedback computation unit 42 thus includes the above-noted DFE feedback taps. The parallel branch metric calculation unit 44 computes the branch metrics for all branches coming into each state, in the manner described above, i.e., using a different input value $y_t(s)$ for each state.

The add-compare-select unit 46 utilizes the branch metrics calculated for a given decoding stage, along with path metrics from a previous stage, to determine a survivor path for a current stage. In other words, the add-compare-select unit 46 adds the branch metrics to their corresponding path metrics, compares the results, selects one as a survivor, and updates the survivor path. The traceback unit 48 traces back the most-likely path through the trellis in order to generate an output corresponding to decoded symbols as determined in accordance with the most-likely path. This output is also provided as an input to the decision feedback computation unit 42, for use in the above-noted DFE path updating. More particularly, the traceback unit 48 traces the last Nb values of each survivor path and then feeds them back to the decision feedback computation unit 42.

The decision feedback computation unit 42 may be implemented as one or more parallel pipelined processing units. For example, multiple parallel decision feedback sections can share the same unit to compute the decision feedback values. Similarly, the parallel branch metric calculation unit can be implemented as one or more parallel pipelined processing units to compute the branch metrics for all the possible paths coming into each of the states, given a different input value for each state. As previously noted, this in contrast to a conventional branch metric calculation unit in a conventional Viterbi decoder, which generally has just a single input value for all states.

It should be noted that when the above-described PDFD algorithm is used, there should be no deinterleavers between the equalizer and the decoder, i.e., channel interleaving typically cannot be used. This does not constitute a significant limitation for systems that operate in slowly-varying, frequency-selective fading channels where the interleaving depth required to make the fading independent from symbol to symbol is impractical.

The performance of an exemplary broadband fixed wireless TDMA system incorporating the above-described PDFD techniques was simulated in order to illustrate the performance gains attributable to the invention. The simulation was performed on a system comprising transmitter 10 and receiver 30 configured in the manner shown in FIGS. 1 and 3, respectively. A two-dimensional Ungerboeck code was utilized, as described in the above-cited G. Ungerboeck references, with 8-PSK, 16-QAM and 32-QAM modulation constellations. More specifically, the FEC channel code utilized was a rate-2/3, 16-state systematic Ungerboeck code, with code polynomials in octal representation given by $h^0=23$, $h^1=04$, $h^2=16$.

The information bits were encoded in FEC encoder 12 of FIG. 1, using the above-noted convolutional code. Zero bits were appended to the end of each packet of information bits to reset the encoder to the all-zero state. Training symbols were appended to the beginning of the encoded data to form frames, in framing block 14. Each frame was then modulated and pulse shaped in block 16, and subsequently transmitted. In the receiver 30, the training symbols, apart from being used for training the equalizer taps, were also used to perform necessary acquisition and synchronization functions. For PDFD, the feedback path of each DFE is implemented within the modified Viterbi decoder 40 on a per survivor basis, in the manner described previously.

The training sequence is chosen to have good auto-correlation properties that aid in both equalizer training and timing recovery. For example, one can use Barker sequences or pseudo-random noise (PN) sequences. The received baseband signal, over-sampled at four times the symbol rate, is first filtered in pulse shaping filter 31 as matched to its corresponding transmit pulse shaping filter. The filtered signal is then correlated with the training sequence in training block 34. The correlation peak indicates the symbol timing. Once the timing is determined, the filtered signal is then sub-sampled to two times the symbol rate and fed to the fractionally-spaced feed-forward filter 33. The training sequence at the beginning of the packet is used to obtain the DFE taps using the normalized least-mean squared (NLMS) algorithm, as described in, e.g., S. Haykin, "Adaptive Filter Theory," Prentice-Hall, NJ, 1996. Several iterations over the training sequence are performed until the resulting mean-squared error is sufficiently small. The feed-forward filter 33 thus includes the channel matching filter and the pre-cursor equalizer. Note that the channel taps are not explicitly estimated in this example.

The simulations compared the performance of the joint DFE and decoding PDFD system of the invention to a conventional separate DFE and decoding arrangement, for both 8-PSK and 16-QAM constellations, and for a number of different channels. The packet size was 160 bits for both the 8-PSK and the 16-QAM cases. The channels included a Gaussian ISI channel, as well as K=8 dB and K=3 dB block Rician fading channels with an exponential multipath power profile and root-mean-squared delay spread of one-half of a symbol. A block fading channel is one in which a new channel instance is generated for every packet of 160 bits.

A DFE with four fractionally-spaced forward taps and three symbol-spaced feedback taps was used in the simulations. The DFE taps were obtained by training, using 52 training symbols, i.e., a 13-chip Barker code repeated 4 times, and a sufficient number of training iterations for the taps to converge. The sampling time was also determined from the training sequence. The actual T/2-spaced channel taps used were 0.9680−j0.0819, 0.1768+j0.1203, 0.0658−j0.0398, 0.0623+j0.0287. These channel taps were obtained as an instantiation of a Rician fading channel with the Rice factor, K=3 dB and with an exponential delay power profile that has a standard deviation of half a symbol duration.

The simulation results indicated an improvement of approximately 3 dB for the 8-PSK joint DFE and decoding technique of the invention at a 1% Packet Error Rate (PER) in the K=3 dB channel, relative to the separate DFE and decoding technique. The improvement for the 8-PSK case was approximately 1.5 dB at 1% PER for the Gaussian ISI channel, and approximately 0.75 dB at 10% PER for the K=8 dB channel. The corresponding improvements were generally slightly less for 16-QAM than for 8-PSK, particularly for the K=8 dB channel where the multipath is not that significant.

Compared to the separate DFE and decoding technique of FIG. 2, which has one DFE path to be updated, the joint PDFD technique as described in conjunction with FIGS. 3 and 4 has $2^v$ feedback paths to be updated, where v is the constraint length of the channel code. Each feedback path requires multiplication of complex-valued filter tap coefficients with codewords in the modulation constellation. More particularly, the DFE output $y_t(s)$ for each state s at decoding stage t is updated using Equation (1). Since each $x_t(s, t-j)$ in the illustrative embodiment is a constellation point in a PSK or QAM constellation, the multiplication of a tap coefficient $b_i$ with a known constant $x_t$ can be implemented by shifters and adders, as described in, e.g., S. Aryavisitakul and G. Durant, "A broadband wireless packet technique based on coding, diversity, and equalization," IEEE Communications Magazine, pp. 110–115, July 1998. Further simplifications in this multiplication process may be obtained using the techniques described in U.S. patent application Ser. No. 09/390,389 of H. Lou and M. Rupp, entitled "Multiplier-free Methods and Apparatus for Signal Processing in a Digital Communication System" and filed concurrently herewith.

The primary complexity increase in the modified Viterbi decoder 40 due to PDFD is attributable to the additional branch metric calculations required. In a standard TCM decoder using the Viterbi algorithm, the branch metrics for different states can be shared, as described in, e.g., H. Lou, "Implementing the Viterbi Algorithm Fundamentals and Real-time Issues for Processor Designers," IEEE Signal Processing Magazine, 12(5):42–52, September 1995. On the other hand, since each state in the modified Viterbi decoder 40 has a different feedback path for the PDFD, the input value for each state is different. Thus, a branch metric has to be computed for each transition in the TCM trellis. That is, for PDFD, if a two-dimensional, rate-k/n, $2^v$-state trellis code is used, $2^{(k+v)}$ branch metrics have to be computed. The branch metric is typically represented as the squared distance between the received symbol and the nearest codeword in each coset. An alternative branch metric representation based on linear distance is described in U.S. patent application Ser. No. 09/390,386 of H. Lou and R. Urbanke, entitled "Methods and Apparatus for Representation of Branch Metrics in a Communication System Decoder" and filed concurrently herewith.

Figure 5:
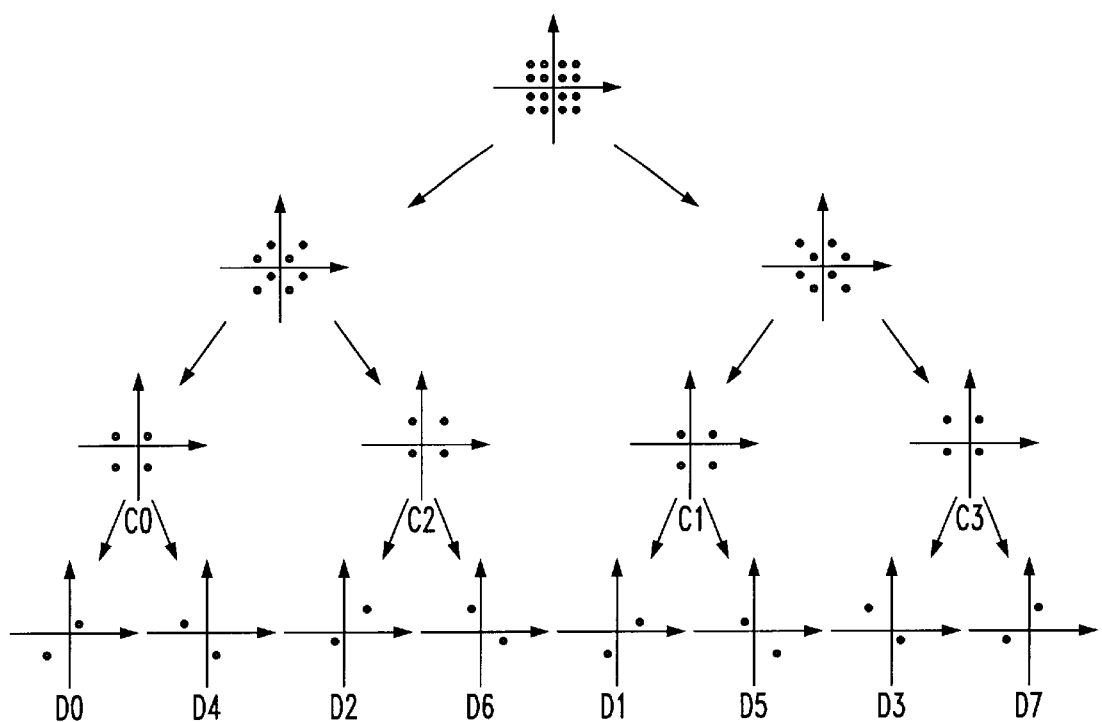
FIG. 5 illustrates a multi-level partitioning of a 16-QAM (Quadrature Amplitude Modulation) constellation.

A method of searching for the nearest codeword in a coset, given the received symbol $y_n$, will now be described. FIG. 5 illustrates the partitioning of an exemplary 16-QAM constellation in accordance with a trellis code. The partitioning generates a number of cosets, including C-level and D-level cosets as shown. The C-level cosets, i.e., cosets C0–C3, each have 4 codewords, and the D-level cosets, i.e., cosets D0–D7, each have 2 codewords. Given a received symbol $y_n$, the codeword that is closest in Euclidean distance to $y_n$ has to be computed first. This closest codeword in coset $C_{ij}$ is denoted by $p_{ij}$.

For the C-level partitioned cosets in the 16-QAM constellation shown in FIG. 5, translation of $y_n$ can first be done so that codewords in the coset are symmetric in the x-and y-dimensions. After that, the sign of $y_n$ in each dimension determines the nearest codeword for that coset. For cosets using D-level partitioning, if a rotated constellation as described in the above-cited U.S. Patent Application of H. Lou and M. Rupp is used, the nearest codeword in each coset can be computed by first translating $y_n$ so that codewords in the coset are symmetric in the x-and y-dimensions. After that, the sign of $y_n$ determines the nearest codeword. If a conventional constellation is used, $y_n$ has to be rotated, e.g., using selection and inversion operations.

Figure 6:
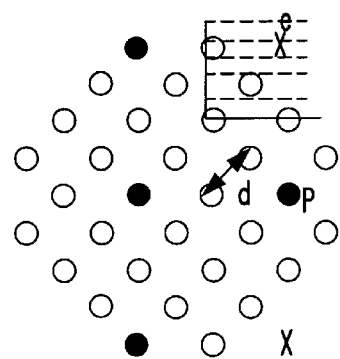
FIG. 6 shows an example of a particular coset in a rotated 32-QAM constellation, illustrating the effects of rounding in computing a nearest codeword.

For 32-QAM and larger constellations, translation and rounding operations can be used to find the nearest codewords. Even though rounding may result in finding a non-existent codeword, it can be shown that the probability of this happening is negligibly small for the range of signal-to-noise ratio (SNR) values over which PDFD typically operates. For example, for one of the D cosets in a rotated 32-QAM constellation shown in FIG. 6, due to rounding, two non-existent codewords marked by 'x' may be determined to be the nearest codewords. If symbol p is transmitted and point e is found by rounding, the received symbol $y_n$ must fall in the shaded region. The probability that $y_n$ falls in the shaded region, $P_{shaded}$, given that p is transmitted is $$P_{shaded} = Q\left(\frac{\sqrt{2d}}{\sigma}\right)\left[1 - Q\left(\frac{\sqrt{2d}}{\sigma}\right)\right],$$

where $$Q(x) = \frac{1}{2}\mathrm{erfc}\left(\frac{x}{\sqrt{2}}\right)$$

and erfc(·) denotes the complementary error function. Assuming an SNR value of ~24 dB, one can compute $$\left(\frac{d}{2\sigma}\right)^2 = \frac{SNR}{10}.$$

See J. G. Proakis, "Digital Communications," McGraw-Hill, New York, 1983. From this computation, it can be determined that $P_{shaded}=Q(14)(1-Q(14))\sim 10^{-45}$. That is, the probability that this rounding error will occur is very small. For larger constellations, the boundary effects due to rounding are even smaller. Therefore, translation and rounding operations, implemented by adders, can be used to compute the nearest codewords for each coset in the PDFD techniques of the invention.

It should be noted that the above-described illustrative embodiments may be implemented in hardware, software or combinations of hardware and software. For example, the computations referred to above may be implemented using hardware and/or software elements of a decoder in the form of an application-specific integrated circuit (ASIC) or any other digital data processing device in, e.g., a communication system receiver.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope of the invention as set forth in the appended claims.

What is claimed is:

1. An apparatus for use in decoding a sequence of received symbols, comprising:

a decoder operative to compute branch metrics associated with transitions between states of a multi-stage trellis representation of a state machine, wherein for a given stage t of the trellis, the branch metrics are computed for at least two states s using a different input value $y_t(s)$ for each state, the input values corresponding to decision feedback equalization values computed for each of a plurality of different survivor paths;

wherein the decoder includes a decision feedback computation unit which computes an extended survivor path for each of the states of the given stage t of the trellis;

wherein the extended survivor path for a given one of the survivor paths is based on the last $N_b$ decoded symbols in that survivor path, where $N_b$ is the number of taps in a feedback filter used in decision feedback equalization; and wherein the survivor path at state s of decoding stage t is denoted by $(x_i(s, i), 1 \leq i \leq t)$, where $x_i(s, i)$ is a decoded symbol on a branch of the trellis between stage i−1 and stage i, and wherein the extended survivor path for state s is computed by the decision feedback computation unit as:

$$y_t(s) = \sum_{i=0}^{N_f-1} w_i r(t+i) - \sum_{j=1}^{N_b} b_j x_t(s, t-j),$$

where r(t) is an output of a feed-forward filter applied to an input of the decision feedback computation unit at stage t, $N_f$ is a number of feed-forward taps in the feed-forward filter, and the feed-forward and feedback taps are $w=(w_1, \ldots, w_{N_f})$ and $b=(b_1, \ldots, b_{N_b})$, respectively, and the extended survivor path value $y_t(s)$ for a given state is used in computation of the branch metrics for that state.

2. The apparatus of claim 1 wherein the symbols are generated in accordance with a PSK modulation constellation.

3. The apparatus of claim 1 wherein the symbols are generated in accordance with a QAM modulation constellation.

4. The apparatus of claim 1 wherein the decoder includes a parallel branch metric calculation unit which computes branch metrics for every state s of the given stage t of the trellis, using a different input value $y_t(s)$ for each of the states s.

5. A decoding method for use in processing a sequence of received symbols, the method comprising the steps of:

computing branch metrics associated with transitions between states of a multi-stage trellis representation of a state machine, wherein for a given stage t of the trellis, branch metrics are computed for at least two states s using a different input value $y_t(s)$ for each state, the input values corresponding to decision feedback equalization values computed for each of a plurality of different survivor paths;

utilizing the branch metrics computed for the given stage of the trellis, and a path metric generated for a previous stage, to determine a particular survivor path and corresponding updated path metric for the given stage; and generating an output representing decoded symbols as determined based on the particular survivor path;

wherein extended survivor paths are computed for each of the states of the given stage t of the trellis;

wherein the extended survivor path for a given one of the survivor paths is based on the last $N_b$ decoded symbols in that survivor path, where $N_b$ is the number of taps in a feedback filter used in decision feedback equalization; and wherein the survivor path at state s of decoding stage t is denoted by $(x_t(s, i), 1 \leq i \leq t)$, where $x_t(s, i)$ is a decoded symbol on a branch of the trellis between stage i−1 and stage i, and wherein the extended survivor path for state s is computed as:

$$y_t(s) = \sum_{i=0}^{N_f-1} w_i r(t+i) - \sum_{j=1}^{N_b} b_j x_t(s, t-j),$$

where r(t) is an output of a feed-forward filter at stage t, $N_f$ is a number of feed-forward taps in the feed-forward filter, and the feed-forward and feedback taps are $w=(w_1, \ldots, w_{N_f})$ and $b=(b_1, \ldots, b_{N_b})$, respectively, and the extended survivor path value $y_t(s)$ for a given state is used in computation of the branch metrics for that state.

6. The method of claim 5 wherein the symbols are generated in accordance with a PSK modulation constellation.

7. The method of claim 5 wherein the symbols are generated in accordance with a QAM modulation constellation.

8. The method of claim 5 wherein branch metrics are computed for every state s of the given stage t of the trellis, using a different input value $y_t(s)$ for each of the states s.

9. A decoder for processing a sequence of received symbols, the decoder comprising:

means for computing branch metrics associated with transitions between states of a multi-stage trellis representation of a state machine, wherein for a given stage t of the trellis, branch metrics are computed for at least two states s using a different input value $y_t(s)$ for each state, the input values corresponding to decision feedback equalization values computed for each of a plurality of different survivor paths;

means for utilizing the branch metrics computed for the given stage of the trellis, and a path metric generated for a previous stage, to determine a particular survivor path and corresponding updated path metric for the given stage; and means for generating an output representing decoded symbols as determined based on the particular survivor path;

wherein extended survivor paths are computed for each of the states of the given stage t of the trellis;

wherein the extended survivor path for a given one of the survivor paths is based on the last $N_b$ decoded symbols in that survivor path, where $N_b$ is the number of taps in a feedback filter used in decision feedback equalization; and wherein the survivor path at state s of decoding stage t is denoted by $(x_t(s, i), 1 \leq i \leq t)$, where $x_t(s, i)$ is a decoded symbol on a branch of the trellis between stage i−1 and stage i, and wherein the extended survivor path for state s is computed as:

$$y_t(s) = \sum_{i=0}^{N_f-1} w_i r(t+i) - \sum_{j=1}^{N_b} b_j x_t(s, t-j),$$

where r(t) is an output of a feed-forward filter at stage t, $N_f$ is a number of feed-forward taps in the feed-forward filter, and the feed-forward and feedback taps are $w=(w_1, \ldots, w_{N_f})$ and $b=(b_1, \ldots, b_{N_b})$, respectively, and the extended survivor path value $y_t(s)$ for a given state is used in computation of the branch metrics for that state.

10. A decoder for processing a sequence of received symbols, the decoder comprising:

a parallel branch metric calculation unit for computing branch metrics associated with transitions between states of a multi-stage trellis representation of a state machine, wherein for a given stage t of the trellis, the parallel branch metric calculation unit computes branch metrics for at least two states s using a different input value $y_t(s)$ for each state, the input values corresponding to decision feedback equalization values computed for each of a plurality of different survivor paths;

an add-compare-select unit having an input coupled to an output of the branch metric calculation unit, the addcompare-select unit utilizing the branch metrics generated by the branch metric calculation unit for the given stage of the trellis, and a path metric generated for a previous stage, to determine a survivor path and corresponding updated path metric for the given stage;

a traceback unit having an input coupled to an output of the add-compare-select unit, the traceback unit generating an output representing decoded symbols as determined based on the survivor path; and a decision feedback computation unit having an input coupled to an output of the traceback unit, and an output coupled to an input of the parallel branch metric calculation unit, the decision feedback computation unit for computing the decision feedback equalization values for the plurality of different survivor paths.

11. An apparatus comprising:

a pulse-shaping filter for receiving a sequence of symbols;

a feed-forward filter having an input coupled to an output of the pulse-shaping filter, the feed-forward filter including a plurality of filter taps for implementing at least a portion of a decision feedback equalization computation; and a decoder having an input coupled to an output of the feed-forward filter, the decoder being operative to compute branch metrics associated with transitions between states of a multi-stage trellis representation of a state machine, wherein for a given stage t of the trellis, branch metrics are computed for at least two states s using a different input value $y_t(s)$ for each state, the input values corresponding to decision feedback equalization values computed for each of a plurality of different survivor paths;

wherein extended survivor paths are computed for each of the states of the given stage t of the trellis;

wherein the extended survivor path for a given one of the survivor paths is based on the last $N_b$ decoded symbols in that survivor path, where $N_b$ is the number of taps in a feedback filter used in decision feedback equalization; and wherein the survivor path at state s of decoding stage t is denoted by $(x_t(s, i), 1 \leq i \leq t)$, where $x_t(s, i)$ is a decoded symbol on a branch of the trellis between stage i−1 and stage i, and wherein the extended survivor path for state s is computed as:

$$y_t(s) = \sum_{i=0}^{N_f-1} w_i r(t+i) - \sum_{j=1}^{N_b} b_j x_t(s, t-j),$$

where r(t) is an output of a feed-forward filter at stage t, $N_f$ is a number of feed-forward taps in the feed-forward filter, and the feed-forward and feedback taps are $w=(w_1, \ldots, w_{N_f})$ and $b=(b_1, \ldots, b_{N_b})$, respectively, and the extended survivor path value $y_t(s)$ for a given state is used in computation of the branch metrics for that state.

* * * * *